(12) United States Patent
Fuertes et al.

(10) Patent No.: US 6,469,161 B1
(45) Date of Patent: Oct. 22, 2002

(54) CHEMICAL FLUIDIFICATION PROCESS AND CONVERSION PROCESS OF STARCHY MATERIALS, AND NEW CATIONIC STARCHY MATERIALS

(75) Inventors: Patrick Fuertes, Lambersart; Anne Lambin, Lomme, both of (FR)

(73) Assignee: Roquette Freres, Lestrem (FR)

( * ) Notice: Subject to any disclaimer, the term of this patent is extended or adjusted under 35 U.S.C. 154(b) by 0 days.

(21) Appl. No.: 09/150,680

(22) Filed: Sep. 10, 1998

(30) Foreign Application Priority Data

Sep. 12, 1997 (FR) .............................. 97 11383

(51) Int. Cl.⁷ .................. C08B 30/12; C08B 30/00; C07H 37/00
(52) U.S. Cl. .................. 536/55.3; 127/65; 127/71; 127/32; 536/45
(58) Field of Search .............. 127/32, 65, 71; 536/45, 55.3

(56) References Cited

U.S. PATENT DOCUMENTS

| | | | |
|---|---|---|---|
| 3,479,220 A | 11/1969 | Ferrara | 127/38 |
| 3,654,263 A | 4/1972 | Cescato | 536/50 |
| 3,692,581 A | 9/1972 | Ferrara | 127/38 |
| 4,097,427 A | 6/1978 | Aitken | 527/312 |
| 4,373,099 A | 2/1983 | Hubbard et al. | 536/105 |
| 4,421,566 A | 12/1983 | Hasuly et al. | 106/206.1 |
| 4,992,536 A | 2/1991 | Billmers et al. | 536/55.1 |
| 5,362,868 A | 11/1994 | Eul et al. | 536/102 |
| 5,766,366 A * | 6/1998 | Ferguson et al. | 127/32 |

FOREIGN PATENT DOCUMENTS

| | | | |
|---|---|---|---|
| EP | 0 041 316 | 2/1985 | |
| EP | 0 406 837 | 1/1991 | |
| EP | 710670 | * 5/1996 | C08B/31/00 |
| EP | 0 710 670 | 5/1996 | |
| GB | 625 688 | 7/1949 | |
| GB | 801 524 | 9/1958 | |
| GB | 1 425 624 | 2/1976 | |
| WO | WO 97/13788 | 4/1997 | |

OTHER PUBLICATIONS

"The manufacture of modified starches", J.A. Radley, Aplied Science Publishers, London 1976.

Modified starches : properties and Uses, O.B. Wurzburg, M.S., 1986.

* cited by examiner

*Primary Examiner*—James O. Wilson
*Assistant Examiner*—Howard Owens
(74) *Attorney, Agent, or Firm*—Henderson & Sturm LLP

(57) ABSTRACT

A chemical fluidification process for a starchy material, which is carried out in a reactor suitable for continuous operation and with a humidity of the reaction mix (starch included) of less thank 25%, which consists in subjecting a starchy material to the hydrolyzing action of a chemical agent. The dwell time of the starchy material in the fluidification reactor is more than 5 minutes and less than 30 minutes. The temperature at the core of said reactor is more than 60° C. and less than 100° C. approximately, a conversion process comprising said chemical fluidification, and starchy materials obtainable by such processes.

19 Claims, No Drawings

CHEMICAL FLUIDIFICATION PROCESS AND CONVERSION PROCESS OF STARCHY MATERIALS, AND NEW CATIONIC STARCHY MATERIALS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The object of the present invention is a process for the conversion of starchy material including a dry phase chemical fluidification stage, a stage conducted continuously and in accordance with particular operating conditions.

It also relates to the converted starchy materials obtained in accordance with the said process, some of the said starchy materials constituting moreover new industrial products.

The present invention concerns lastly the industrial uses of the said starchy materials, in particular in the manufacture of paper, adhesives or jellied products.

2. Description of the Prior Art

The conversion of starchy materials involves the use of physical, chemical and/or enzymatic means appropriate to the technical, economic and statutory constraints set by the different industrial sectors for which these products are intended. These sectors are extremely diverse and include notably the food, pharmaceutical, cosmetics, chemical, pesticide, textile and paper industries as well as the fields of packaging, gums and adhesives, building materials or environmental protection.

According to the uses, and application properties required, the conversion of the starchy material may be mainly based on a single process or, on the other hand, necessitate the association of two, or more, processes of every kind, the latter being moreover capable of simultaneous or successive application.

Among the numerous processes which can be applied to starchy materials, chemical fluidification techniques have aroused genuine interest, for more than a century, in numerous branches on industrial activity.

By chemical fluidification is here understood any operation consisting in subjecting a starchy product, and this at a temperature generally lower than 100° C., to the hydrolysing action of a chemical agent, for example an acidic compound or (per)oxidising agent, the said agent being able to be used in a liquid, solid and/or gaseous form. This type of operation is carried out in conditions such that the resulting fluidified product has, compared with the original product, a) generally little or no increase in cold solubility and b) relatively little or no modification in humidity, in all cases kept above 6–7% approximately.

This definition differentiates chemical fluidification techniques from enzymatic hydrolysis techniques, the latter using enzymes, enzymatic cocktails or micro-organisms as the sole or main means of fluidification.

It differentiates them also from the hydrolytic processes of dextrinification or, more broadly, of pyroconversion, which involve, in practice, the application of very high temperatures, i.e. generally somewhere between 120 and 170° C., to particular starchy materials, namely starches generally pre-acidified, pre-dried, and maintained, during the reaction, at maximum humidities of 5% approximately.

These pyroconversion processes give rise for their part to particularly dry, powdery and hygroscopic products (white or yellow dextrines, "British gums") the cold solubility of which is high, even total, in all cases very significantly increased in relation to the cold solubility of the original starchy material.

Compared with these processes of pyroconversion or dextrinification, chemical fluidification techniques generally have a certain number of technical or economic advantages linked to the operating conditions or to the characteristics of the products to be processed and/or those obtained and in particular:

- absence of the need to pre-dry the original starchy material,
- use of lower reaction temperatures,
- reduction of the risks of explosion,
- lower solubility of the processed material, hence a better applicability of the latter to subsequent modifications notably those carried out in a hydrous medium.

When they are applied to native starchy products, i.e. those not yet subjected to any physical, chemical and/or enzymatic process, chemical fluidification techniques additionally enable the preparation of converted products with a range of physio-chemical properties much sought after in particularly diverse fields of activity as for example the food, pharmaceutical, paper, and textile industries, the gums and adhesives industries and the building materials industries.

Such common properties, obtained for example, by the hydrolysing action of inorganic acids (hydrochloric acid, sulphuric acid, phosphoric acid, gaseous HCl, etc.) are generally linked to the reduction in the molecular weight of the product obtained and consist notably of:

- reduced intrinsic viscosity and hot viscosity, the hot viscosity being capable of assessment by measuring Water Fluidity or WF,
- increased content in reducing sugars,
- not significantly modified cold solubility,
- increased hot solubility,
- increased gel strength and film strength, All these properties are fully described by:

- O. B. WURZBURG in "Modified starches: Properties and uses—Chapter 2, pp 17–40, CRC Press, Inc. 1986"
- R. C. ROHWER et al. in "STARCH, $2^{nd}$ ed.—Chapter XV11, pp 529–541, Academic Press, Inc. 1984", and
- J. A. RADLEY in "Starch Production Technology—Chapter 20, pp 449–457, Applied Science Publishers Ltd, 1970".

One of the main techno-economic advantages of chemically fluidified starchy products consists of their aptitude for being used and processed, particularly of their aptitude for being baked and made to gel, with very highly dried out matter. This is due to their considerably lowered viscosity compared with native products. This aptitude is expressed in energy savings (smaller volumes of water to be eliminated) and technological advantages widely exploited in industry, for example in the manufacture of gums and jellied foodstuffs, the sizing the coating of paper, textile sizing and the finishing or the preparation of adhesives for plaster sheets and corrugated board, as described in the previously mentioned reference works of WURZBURG, ROHWER and RADLEY.

Another advantage of chemical, including acid and oxydative, fluidification techniques lies in the possibility of combining them with other types of modification, in particular with etherification and esterification reactions. Thus, in the context of the conversion of starchy materials, a chemical fluidification stage can be preceded, followed and/or conducted at the same time as other chemical modifications as for example:

a hydroxypropylation reaction as described by K. M. CHUNG et al. In "Die Stärke, 43, No. 11, pp 441–446, 1991, a hydroxyethylation reaction as described in U.S. Pat. No. 5,362,868, a cationisation reaction as described in U.S. Pat. Nos. 4,373,099; 4,097,427; 3,654,263 and 4,421,566.

The previously re-stated advantages of chemical fluidification methods and of the products arising from them are, in general, obtained irrespective of whether the said methods are carried out in a hydrous environment or, conversely, in dry phase.

By dry phase is here understood fluidification carried out at he core of a reaction mix (starch included), the humidity of which is in practice less than 25% approximately, preferably somewhere between about 8 and 22%. Hydrous medium methods involve for their part a much more dilute reaction medium, with use of a starch slurry with solid matter generally not exceeding 35 to 40%.

Hydrous medium fluidification methods remain widely used in industry in the context of the conversion of starchy materials. However, they involve the use of an additional filtration stage which has the drawback of giving rise to substantial losses of soluble matter mainly in damaged starch granules, in soluble starch molecules and in salts generated during the prior neutralisation of the fluidified starch. This is expressed both by a reduction in the output of fluidified starchy materials and by an increase in effluent pollution loading.

In addition, chemical fluidification methods carried out in a hydrous medium do not always in practice enable native or modified starches which are sufficiently hydrolised to have a water fluidity (WF) greater than about 55, particularly between 65 and 90, to be obtained in a short period of time (1 to 3 hours for example). Fluidified products with these kinds of WF values are required, for example, in paper sizing or textile pasting operations.

The aforementioned drawbacks have contributed, particularly over the last thirty years, to the research and development of dry phase chemical fluidification techniques. Thus, U.S. Pat. Nos. 3,479,220 and 3,692,581 describe a chemical fluidification process for starchy materials (starches, flours) by bringing these materials into contact, at ambient temperature, (25° C.), with a concentrated inorganic acid put on a dry and finely divided inert medium. The concomitant use of hydrogen fluoride, specifically described in U.S. Pat. No. 3,692,581, enables the hydrolysis reaction to be accelerated somewhat. Despite this refinement, reaction times remain particularly long, i.e. anything from one to several days and the authors do not plan specially to increase the reaction temperature so as to bring these times down to industrially exploitable values.

FR patent 1,553,744 describes a starch hydrolysis process during which a starch/inorganic acid/water-soluble amide mix is maintained in a fluidified state by the action of an ascendant gas. Despite this fluidisation, which favours heat transfers and system homogeneity, and high hydrolytic agent introduction rates (0.5 to 20%/starch) it appears from reading this document, that obtaining sufficiently hydrolysed products within a period from thirty minutes to 3 hours (a time described as "reasonable" in this document) necessitates the use of high temperatures, of between 110° and 140° C.

In addition, the original mix is pre-dried to a low moisture content (8%) with a view to its transfer to a fluidised bed.

EP patent 041,316 describes a general process for the chemical modification of starch which consists, when it is applied in the dry phase, in preparing a starch mix/modification agent so that the said mix has between 15 and 25% humidity, preferably somewhere between 17 and 19%, and in subjecting the said mix to the action of ultrahigh frequency radiation so as to modify the starch. This document does not give details of any example of chemical fluidification of a starchy material, including in the dry phase. Reading this document shows that, in practice, the use of ultrahigh frequency radiation is accompanied by an extremely short reaction time, namely equal to 5 minutes maximum, often less than or equal to 1 minute (cf column 3, l. 15–21 EP patent 041,316-B1).

The examples of dry phase chemical modifications described in this patent concern the cationisation, the carboxymethylation or the cationisation/phosphatation of a maize starch at eh core of a reaction mix spread uniformly and not very thickly (3 cm) on a conveyor belt which rapidly traverses a UHF radiation furnace. The dimensions and thereby even the frequency ($2450_{MHZ}$) of this furnace must be adapted to the processing of the starch. Despite a very short dwell time in the said furnace, calculated at 1 minute 15 seconds, this mix undergoes significant dehydration, of about 3 or 6% in the absolute i.e. compared with the initial humidity of the said mix (15 to 18%), a water loss of 20 to 33.3%.

EP patent 710,670 describes a continuous chemical modification process in accordance with which a starch powder and a modification agent, for example a hydrolytic agent or an alkylation agent, are introduced simultaneously into a thermostatically controlled turbo-reactor comprising a propeller rotating at 300–1500 revolutions per minute. This device enables, almost instantaneously, the creation of a fluid, fine, dynamic and highly turbulent layer of a close mix between the starch particles and the chemical agent.

With such a device, the chemical modification of starch is carried out in particularly short times of about one minute or less than one minute. The dwell time of the starch in the turbo-reactor may in particular be only about 30 seconds as described in example 1 of the said patent which envisages the hydrolysis at 50° C. of a maize starch by hydrochloric acid. Such reaction times imply that all operational parameters (reaction temperature, propeller speed, reagent ratios, etc. may be perfectly predetermined, measured and controlled to avoid obtaining a converted product not corresponding to specifications laid down.

WO patent application 97/13788 describes, in general terms, a chemical fluidification process for starches carried out in the dry phase and continuously, involving the compulsory use of a plug flow reactor. This reactor is described as enabling a substantially homogeneous converted product to be obtained, unlike a turbulent reactor which favours heterogeneity of dwell times and therefore of conversion levels of starchy particles.

However, no real details are given in this document of any precise example of the preparation of a fluidified starch.

In addition, the general considerations of the description show that in practice, efficient industrial exploitation of the said process requires at least:

the use, before and during fluidification, of a starch with 10 to 13% humidity, the pre-drying of the starch then its hydrolytic processing, at temperatures of between 38° and 60° C. (100°–140° F.) not exceeding a maximum in all cases of 77° C. (170° F.), the pneumatic conveying of the starch to the reaction chamber (plug flow reactor), the "injection" of the hydrolytic agent into the airflow conveying the as yet non-fluidified starch to the plug flow reactor, dwell times, in the plug flow reactor, of about 1 to 4 hours, in all cases more than 0.5 hours, and a plug flow reactor of given geometry (angle of taper of 65–75, height/diameter ratio >2, etc.). These two latter constraints (dwell time, reactor geometry) mean that, in order to obtain industrially cost-effective production capacities, the volume and the height of the plug flow reactor give rise to technological problems, in particular of poor flow of the starchy material. Indeed, the pressure exerted at the bottom of the reactor becomes very high (several bars) and gives rise to or favours caking of the material with considerable disruption to the flow.

Henceforth it was found that it was possible, in the general context of the conversion of starchy materials to have a new chemical fluidification process of the said materials which is at once straightforward, fast and high performance.

BRIEF SUMMARY OF THE INVENTION

The applicant has particularly noted that it was quite possible to fluidity effectively and continuously starchy materials of every origin, nature and destination and to do this, in relatively short reaction times without thereby necessarily needing:

devices/processes of (pre)-drying or fluidification which are specific, complex and/or expensive in design, implementation and control, ranges of reaction temperatures or of quantities of hydrolytic chemical agent greater than those encountered most frequently in the prior art.

DETAILED DESCRIPTION OF THE INVENTION

More precisely, the object of the present invention is a starchy material conversion process including a chemical fluidification stage consisting in subjecting, in the dry phase and in a reactor capable of operating continuously, a starchy material to the hydrolysing action of a chemical agent, this process being characterised in that:

the dwell of time of the starchy material in the fluidification reactor is more than 5 minutes and less than 30 minutes approximately, the temperature at the core of the said reactor is more than 60° C. and less than 100° C. approximately.

In accordance with a first variant of the process of the invention, the dwell time of the starchy material in the fluidification reactor is somewhere between 6 and 28 minutes approximately and the temperature at the core of the said reactor is somewhere between 65° and 90° C. approximately.

It is advantageous for the dwell time of the starchy material in the fluidification reactor to be somewhere between 6 and 25 minutes approximately.

In accordance with another preferential variant, the temperature at the core of the fluidification reactor is somewhere between 65° and 85° C. approximately.

A first concern of industry in the starchy materials conversion process in accordance with the invention is to expect, during the actual chemical fluidification stage, relatively short reaction times, illustrated by dwell times of the starchy material in the fluidification reactor of less than 30 minutes approximately.

Thus, in the context of continuously conducted operations, the volume of starchy material being fluidified in the reactor at any given time is limited compared with a technology anticipating significantly greater dwell times as described for example in the aforementioned WO patent application 97/137988.

As a result of which, in the event of any drift of the fluidification operation during the implementation of the process of the invention, in particular in case, for a given reason, the starchy materials have been fluidified beyond the required amount, the volumes of products which are unsatisfactory and needing to be downgraded would be heavily reduced compared with those which, in the same case, would ensue from a fluidification technology with a (relatively) high dwell time.

This constitutes an undeniable economic and industrial advantage.

On the other hand, dwell times expected in compliance with the invention are sufficiently long (>5 minutes) not to involve necessarily, even if it can be expected, the additional use of very specific devices necessary for a fluidification reaction which is at once ultra fast or almost instantaneous, homogeneous and controlled. Such devices are, for example, described in the aforementioned patents EP 041,316 (UHF radiation device) and EP 710,670 (turbo-reactor).

Al already indicated, the fluidification stage complying with the present invention has the additional interest of being able to be conducted on non-specific devices which are straightforward to use, and particularly on reactors of very diverse geometry, dimensions, and modes of operation.

By "reactors" is here understood both, in particular, the plug flow type reactors, which are not ruled out in the context of the present invention, and turbulent reactors or other chambers of the blender type, enabling the more or less exhaustive homogenisation of the material being fluidified. And it is worth noting that the fluidification stage complying with the invention can be conducted to advantage, as will be described moreover, at the core of a straightforward ploughshare blender/heater capable of continuous operation such as those marketed under the "LODIGE" brand.

Moreover, given the short dwell times anticipated in compliance with the present invention, the reaction volumes required to achieve a given level of production are significantly reduced and make the use of plug flow reactors much easier. The size of the equipment, particularly its height, being reduced, the pressure exerted on the starchy material at the bottom of the reactor is also reduced; which considerably restricts problems of caking.

Another interest of industry in the starchy materials conversion process in accordance with the invention is the inclusion of a stage of chemical fluidification which can be easily combined, if required, with one or more other operations of chemical and/or physical modification of starchy materials, operation(s) capable of being carried out moreover prior to, subsequent to or simultaneously with the said fluidification stage.

The applicant Company has particularly noted that the fluidification stge complying with the invention could be not only applied to starchy materials of extremely diverse natures, including those already modified chemically and/or physically, but also constitute a stage prior to or concomitant with one or more stages of modification of the starchy materials.

By "starchy material" in the sense of the present invention, is understood all native starches, of natural or hybrid origin, including those resulting from genetic mutations or manipulations, as well as all modified starches resulting from the chemical and/or physical modification, in one or more stages, of the said native starches. The starches, native or modified, can in particular come from potato, potato with a high amylopectin content (waxy potato), maize, corn, maize with a high amylopectin content (waxy maize), maize with a high amylose content, rice, peas or cassava, cuts or fractions which can be made or obtained such as amylose, amylopectin, granulometric cuts known professionally under the terms corn starch "A" and corn starch "B", and any mixes of at least two of the above-mentioned products, for example a mix of at least one tuber starch (potato flour particularly) and of at least one cereal starch (corn starch "A", corn starch "B". maize, waxy maize particularly). The starchy materials which can be used in accordance with the invention can also consist of flours or other mixes containing starch(es) and vegetable protein(s), the starch(es) component pre-dominating, and all the products resulting from the chemical and/or physical modification, in one or more stages, of the said flours and the said mixes.

When, in the context of the invention, a chemically modified product is used as the starchy material intended for fluidification, the latter is selected particularly from the group including starches and flours modified by one, at least, of the known techniques of etherification, esterification, sulphonation, oxydation or plastification, in particular cationisation, hydroxyalkylation or acetylation.

As a result of which, in accordance with one variant, the starchy materials conversion process in accordance with the invention is characterised in that the starchy material subjected to the chemical fluidification stage is selected from among native starches and flours and from products resulting from etherification, esterification, sulphonation, oxydation and/or plastification, and in particular cationisation, hydroxyalkylation or acetylation, of the said starches and the said flours.

The applicant Company has particularly noted that the starchy material subjected to fluidification could to advantage be constituted by a cationic starch.

Such products can be prepared by any known technique, conducted in a hydrous medium, in a solvent medium or in dry phase, suitable for enabling one or more electropositive nitrogenous group(s) to settle on the starch. The said nitrogenous groups can particularly contain at lest one tertiary or quaternary nitrogen atom.

The cationic starches which can be used in accordance with the invention have a non-restrictive fixed nitrogen rate of between 0.04 and 2.0%, expressed in relation to the dry weight of the starch. These products may moreover be of the "polycationic" type like those described, for example, in EP patent 406,837 and U.S. Pat. No. 4,492,536. They may also be of the "amphoteric" type, since they may also carry anionic groups such as phosphate, (sulpho)succinate, alkylsulphonate, sulphate or alkylcarboxylate groups.

Surprisingly and unexpectedly, the applicant Company has noted that the chemical fluidification stage anticipated in compliance with the present invention, could most definitely have industrial application and this, even when the cationic starch subjected to fluidification had characteristics certain a priori to cause problems of control of the viscosity of the material (cationic starch corn based and/or containing relatively high rates of cationisation residues) and/or caking of the material (cationic starch having over 10% approximately of humidity).

In the context of the present invention, chemical agents of very diverse natures and concentrations, such as those used in compliance with one and/or other of the aforementioned documents of the prior art, can be used as means of fluidification of starchy materials. These chemical agents can particularly be selected from among the products with hydrolysing action listed on page 4, lines 5 to 18 of the aforementioned WO application 97/13788, this passage being incorporated in the present description.

These agents can particularly consist of inorganic or organic acids or (per)oxydizing agents, these products being able to be used in a liquid, solid and/or gaseous form.

As previously indicated, the short dwell times anticipated in compliance with the present invention as regards the fluidification stage, in no way compel however the use of amounts of chemical agent with hydrolysing action greater than those encountered conventionally in the prior art. As a result of which, the amount of chemical agent with hydrolysing action generally used will be about 0.01 to 2%, preferably from 0.05 to 1.0% approximately, expressed as dry/dry in relation to the weight of the starchy material to be fluidified.

In accordance with one straightforward, effective and inexpensive mode of operation of the process forming the object of the invention, this process is characterised in that the starchy material is subjected, with a view to its fluidification, to the hydrolysing action of an inorganic acid, in particular hydrochloric acid or sulphuric acid, the said acid being introduced at the rate of 0.01 to 0.4% expressed as dry/dry weight in relation to the weight of the starchy material.

The water contents of the starchy material 1) subjected to fluidification and 2) being fluidified, do not constitute critical parameters of the conversion process of the invention.

In accordance with a preferential variant of the conversion process claimed herein, the starchy material has constantly, during the actual fluidification stage, a water content of between 10 and 15%.

As previously indicated, the said fluidification stage may also be conducted simultaneously or prior to any one or more other stages of chemical and/or physical modification of the starchy material.

Such stages, conducted simultaneously or subsequent to the actual fluidification stage, may particularly consist of the use of one at least of the chemical modification techniques mentioned above and which can be applied to as yet non-fluidified products. As a result of which, the starchy materials conversion process of the invention the characteristics of which have been described previously, can in addition be characterised in that, after and/or during fluidification, the starchy material is subjected to at least one subsequent and/or simultaneous chemical modification stage, in particular etherification, esterification, sulphonation, oxydation or plastification and particularly cationisation, hydroxyalkylation or acetylation.

In accordance with a preferential variant of the said process, the starchy material is subjected, after fluidification, to a cationisation stage.

As such, the applicant has found that it was possible to conduct to considerable advantage first the dry phase fluidification of the starchy material in compliance with the present invention then, immediately afterwards or not, its cationisation, particularly in the dry phase.

This order of reactions, namely fluidification followed by cationisation, corresponds to the reverse of the order that it would be logical to use since it is known that fluidification, by its nature, generates the formation of CH=0 reducing groups (hydrolysis of starch chains), which are then liable to stain the material to a greater or lesser degree when they are brought into the presence of an alkaline agent as is the case during the subsequent cationisation stage.

To the knowledge of the applicant Company, such an order of reaction, carried out in the dry phase, has never been expressly described in the literature. So, the use in practice of such a concept brings, as the applicant has noted, certain advantages to industry among which are:

the possibility of validating the viscosity of batches further upstream of the general conversion process, i.e. from before cationisation, the possibility of recycling more easily the batches of fluidified products in the event of a problem with viscosity (such batches have not yet gone through the cationisation stage and so may be subjected to other types of modification), the possibility of better control over the acidity of the medium and fluctuations in the viscosity of the material.

As a result of which the present invention also concerns a new starchy material conversion process characterised in that it includes:

a fluidification stage, in dry phase, of the said material, and a subsequent cationisation stage, in dry phase, of the fluidified starchy material obtained.

It is also appropriate to insist at this point in the description on the fact that the dry phase chemical fluidification stage anticipated in compliance with the present invention enables, when it is combined (simultaneously or not) with a cationisation stage, the obtaining, inter alia, of new cationic starchy materials, which may be used to advantage in the fields of paper-making (facing/coating of paper particularly) or of gums and adhesives (adhesives for plaster sheets and corrugated board particularly).

In accordance with a first variant, these new cationic starchy materials are characterised in that they have simultaneously:

water fluidity (WF) of at least 65 approximately, particularly between 70 and 90, and a fixed nitrogen rate of at lest 0.30% and less than 0.50%, particularly between 0.30 and 0.48%, expressed in relation to the dry weight of the said material.

In accordance with a second variant, these new cationic starchy materials are characterised in that they have simultaneously:

water fluidity (WF) of at least 50 approximately, particularly between 65 and 90, and a fixed nitrogen rate of at lest 0.04% and not exceeding 0.12%, particularly between 0.05 and 0.10%, expressed in relation to the dry weight of the said material.

Such weakly cationised fluidified starches, for example a starch based on maize or potato having a fixed nitrogen rate of 0.08% approximately and a WF of 68% approximately, can be used to advantage in the field of facing and coating paper.

In accordance with a third variant, these new starchy materials are characterised in that they consist of corn or potato starches having simultaneously:

water fluidity (WF) of at least 65 approximately, particularly between 70 and 90, and a nitrogen rate of between 0.20 and 2% approximately, particularly between 0.22 and 1%.

Such new fluidified cationic products, for example fluidified cationic corn starches having WF values of between 70 and 90 and nitrogen rates from 0.30–0.48, are liable to be obtained by using the conversion process of the invention.

As a result of which the said process constitutes a new, particularly straightforward, inexpensive and high performance method of obtaining converted (notably fluidified, fluidified/cationised, fluidified/hydroxypropylated, etc.) starchy materials including newly converted products from native starchy materials, in particular from corn and potato, which thus find new opportunities for industrial use.

The industrial sectors concerned by starchy materials complying with the present invention are those for which the fluidified starchy products which have been previously listed are generally intended. These fields of use concern notably the paper, textile, gums and adhesives, building materials, and detergents industries, the food, pharmaceutical and cosmetics industries. They concern in particular the facing and coating of paper, textile sizing and finishing, the preparation of adhesives for plaster sheets and corrugated board, the preparation of gums and jellied products for use in the food, pharmaceutical or cosmetics industries.

The invention will be better understood with the help of the following examples which set out some ways in which the converted starchy materials of the invention can be prepared and used to advantage.

EXAMPLE 1

Test to Convert a Native Starchy Material by Using a Fluidification Stage Not Complying with the Present Invention Into a high speed blender is placed continuously and at ambient temperature a maize based native starch with 13% humidity by weight at the rate of 5 T/hour and, simultaneously, a 10% dilute hydrochloric acid solution at the rate of 75 1/hour i.e. 0.13% acid, dry expressed weight/dry weight of starch.

The acidified mix is then placed, also continuously, into a blender heater to reach a temperature of about 52° C.

The heated acidified mix is then placed, continuously, into a heat insulated static reactor of the plug flow type with a volume of 25 m$^3$. The dwell time in the said reactor is 3 hours.

After this contact time, the hydrolysed product obtained is extracted continuously from the reactor and neutralised with a 10% sodium carbonate solution up to a pH of 6.0 approximately. The product is then dried to about 13% humidity.

The viscosity of the product obtained is assessed regularly by measuring the "Water Fluidity" or "WF" widely known professionally.

During extraction, the measured viscosity of the product is random in the extreme and oscillates between 10 and 70 WF approximately.

These results show that it is particularly difficult to obtain, in these conditions, and notably for a required dwell time of 3 hours, a real plug flow effect on industrial equipment. Samples taken of the reactor output confirm that the product is caking and flows with difficulty. This gives rise to variable dwell times and therefore more or less random degrees of hydrolysis.

EXAMPLE 2

Conversion of a Native Starchy Material Using a Fluidification Stage Complying with the Present Invention The conditions of this test are identical to those described for EXAMPLE 1 except that:

the temperature at the core of the blender heater is 75° C. approximately, the dwell time of the starchy material in the reactor is 10 minutes approximately, the acidified blender thus heated is neutralized directly, i.e. without transition in any static reactor.

The WF fluidity of the product obtained is surprisingly stable during the test, about 65–67, and matches the targeted objective.

This product is presented as a white powder, of very satisfactory flow.

EXAMPLE 3
Conversion of a Cationic Starchy Material Using a Fluidification Stage Complying with the Present Invention Into a high speed blender is placed continuously at the rate of 3T/hour and at ambient temperature, a cationic maize starch with 12% by weight of humidity and a fixed nitrogen rate of approximately 0.16%. Simultaneously, a 9% hydrochloric acid solution is introduced and this, at the rate of 60 1/hour.

The acidified mix is then put, also continuously, in a blender/heater. The temperature at the core of this reactor is 80° C. approximately. The dwell time of the starchy material in this reactor is 10 minutes approximately. The acidified mix thus heated is neutralised directly, i.e. without transition in any static reactor, then dried. The fluidity of the product obtained is surprisingly stable during the test. Its value (WF 60) matches the targeted objective.

This example confirms the possibility of fluidifying a starchy material (native or modified) in a straightforward, fast and homogenous way by using the dwell time and temperature characteristics anticipated for the fluidification stage in compliance with the conversion process of the invention.

EXAMPLE 4
Application of Starchy Materials Obtained in Compliance with the Present Invention in the Field of Paper Sizing The dry phase fluidified cationic maize starch obtained in accordance with the present EXAMPLE 3 was tested in paper facing.

Initially the hot stability of this product was checked by studying, at different temperatures, the BROOKFIELD viscosity (rotation speed: 100 revolutions per minute) of a gum with 10% solid matter (SM). The results obtained show the very great stability of this product the viscosity of which increases steadily but in a very limited way between 80° C. (BROOKFIELD viscosity=59 m Pa.s or centipoises) and 25° C. (176 m Pa.s).

This very great stability was confirmed by a 24 h. storage test at 70° C. at the end of which the product (gum with 10% SM) did not suffer either notable decantation, or significant loss of viscosity or staining.

For the actual sizing test, the fluidified cationic starch was put in hydrous dispersion form with SM of about 12.5% which was then subjected to heat treatment in a continuous cooker (3 minutes at 140° C.).

Next the ink jet colour print quality of a paper sized with the gum thus obtained was evaluated. The paper used for this test is a printing/writing type wood free paper having a basis weight of 78 g/m$_2$, an ash content of 24% (450° C.) and a BENDTSEN porosity of 1330 ml/minute.

The gum was applied to this paper at a rate of 3.8 g/m2 and this, by using a laboratory coating machine with size press. The print test is conducted on an inkjet colour printer of the "HP 560" type. The papers are printed in accordance with the computerised test IV program entitled "Paper Acceptance Criteria for HEWLETT PACKARD DESKJET 500 C".

In the present case from the fluidified cationic starch resulting from EXAMPLE 3 above was obtained very good quality ink jet colour printing, including the very selective criterion of printing quality for the colours black and yellow and particularly the contrast and definition of the outlines of areas so coloured and the extent of possible bleeding of the black and yellow colouring agents.

Ink jet colour printing of the same quality was moreover observed, in the same conditions, with the non cationic fluidified starch obtained in accordance with EXAMPLE 2 above.

EXAMPLE 5
Conversion of a Starchy Material Using a Fluidification Stage Complying with the Present Invention Into a high speed blender is placed continuously and at ambient temperature, a maize based native starch with 13% by weight of humidity at the rate of 5 t/hour and simultaneously, a 1.54% dilute sulphuric acid solution at the rate of 850l/hour, i.e. 0.30% of acid expressed as dry weight/dry weight of starch.

The acidified mix is then put, also continuously, in a blender/heater to reach a temperature of approximately 95° C.

The dwell time of the starchy material in this reactor is 20 minutes approximately.

The acidified mix thus heated is neutralised directly, without transition in any static and dried reactor.

The WF fluidity of the product obtained is stable during the test, at about 66 WF and matches the targeted objective.

This example shows that in the context of the present invention, a starchy material may be legitimately subjected to the hydrolysing action of sulphuric acid.

EXAMPLE 6
The conditions of this test are identical to those in EXAMPLE 3, except that:
1) the original cationic starchy material consisted:
   either of a cationic corn starch with 12% humidity and a fixed nitrogen rate of 0.48% approximately,
   or of a cationic potato flour with 17% humidity and a fixed nitrogen rate of 0.64% approximately.
2) the targeted objective was, in terms of fluidification, to reach a WF of 72–75 approximately for both these products.

The said objective was reached with no particular problem by increasing the dwell time by a few minutes compared with that applied for EXAMPLE 3.

And it is worth noting that the fluidification stage complying with the invention can be applied to starchy materials of very diverse types, including, as in the present case, to starchy materials likely to generate industrial problems in the control of viscosity (corn starch, particularly cationic) or caking (potato flour, including cationic).

These industrial problems explain, at least partly, why, to the knowledge of the applicant Company, up till now specifically corn or potato based cationic starches with a relatively high water fluidity, namely of at least 65, particularly between 70 and 90, have not been available on the market.

The applicant Company has not only shown, as described above, that it was possible to obtain, in a straightforward and industrial manner, such cationic starchy materials, but also it has been able to observe during tests carried out in accordance with the protocol described in EXAMPLE 4, that new industrial products of this type could legitimately be used for the facing of paper, in particular with a view to obtaining good quality ink jet colour printing.

EXAMPLE 7
The conditions of this test are identical to those in EXAMPLE 3, except that:

1) the starchy material subjected to the dry phase fluidification stage complying with the invention, consisted of a native maize starch,
2) the targeted objective was to cationise in dry phase the fluidified maize starch thus obtained.

The applicant Company has found that it was quite possible to conduct first the dry phase fluidification of the said maize starch, then subsequently its dry phase cationisation.

The industrial interest of this order of reactions has been previously restated. In the present case, the product obtained, i.e. a "maize starch" which has been fluidified (WF: 60) then dry phase cationised (fixed nitrogen: 0.10%), has proved to be only very slightly more stained than the cationised and then fluidified product obtained in accordance with EXAMPLE 3, but to be just as effective as the latter in its paper facing application, during tests carried out in compliance with EXAMPLE 4.

This test has confirmed that the fluidification stage complying with the invention could be considered as a universal method for starchy materials conversion, applicable both prior to and subsequent to one or more other stages of modification, particularly cationisation, of starchy materials.

What is claimed is:

1. A chemical fluidification process of starchy material which is carried out in a reactor suitable for continuous operation and with a humidity of the reaction mix, said mix including starch, of less than 25%, consisting in subjecting a starchy material to the hydrolysing action of a chemical agent, wherein:

the dwell time of the starchy material in the fluidification reactor is more than 5 minutes and less than 30 minutes, and the temperature at the core of said reactor is more than 60° C. and less than 100° C. approximately.

2. A process according to claim 1, wherein it is carried out with a humidity of the reaction mix, said mix including starch, between 8 and 22% approximately.

3. A process according to claim 1, wherein the dwell time of the starchy material in the fluidification reactor is between 6 and 28 minutes, and the temperature at the core of said reactor is between 65° C. and 90° C.

4. A process according to claim 1, wherein the dwell time of the starchy material in the fluidification reactor is between 6 and 25 minutes.

5. A process according to claim 1, wherein the temperature at the core of said reactor is between 65° C. and 85° C.

6. A process according to claim 1, wherein the starchy material is selected from the group consisting of native starches, flours, products resulting from etherification, esterification, sulphonation, oxidation and/or plastification, cationisation, hydroxy-alkylation and acetylation, of the said starches and the said flours, and mixtures thereof.

7. A process according to claim 6, wherein the starchy material consists in a cationic starch, optionally with anionic groups.

8. A process according to claim 1, wherein the chemical agent used to carry out the hydrolysis on the starchy material is an inorganic acid selected from the group consisting of hydrochloric acid and sulphuric acid, introduced at a rate of 0.01 to 0.4% by weight expressed as dry/dry in relation to the weight of starchy material.

9. A conversion process of a starchy material, comprising the fluidification process according to claim 1, and, afterwards, at least one chemical modification of the fluidified starchy material, said modification being selected from the group consisting of etherification, esterification, sulphonation, oxidation and plastification, cationisation, hydroxyalkylation and acetylation.

10. A process according to claim 9, wherein the fluidified starchy material is subjected to a cationisation stage carried out with a humidity of the reaction mix said mix including starch, of less than 25%.

11. A conversion process of a starchy material, comprising the fluidification process according to claim 1, wherein the starchy material is subjected simultaneously to the fluidification process and to at least one stage of chemical modification selected from the group consisting of etherification, esterification, sulphonation, oxidation and plastification, cationisation, hydroxyalkylation and acetylation.

12. A conversion process of a starchy material, which comprises:

a fluidification stage carried out with a humidity of the reaction mix, said mix including starch, of less than 25%, and a subsequent stage of cationisation of the starchy material thus fluidified, carried out with a humidity of the reaction mix, said mix including starch, of less than 25%.

13. A cationic starchy material having simultaneously:

a water fluidity (WF) of between 65 approximately and 100, and a fixed nitrogen rate of between 0.30% and 0.48%, expressed in relation to the dry weight of the said cationic starchy material.

14. A cationic starchy material, having simultaneously:

a water fluidity (WF) of between 50 approximately and 100, and a fixed nitrogen rate of between 0.04% and 0.12%, expressed in relation to the dry weight of the said cationic starchy material.

15. A cationic starchy material consisting of a corn or potato starch having simultaneously:

a water fluidity (WF) of between 65 approximately and 100, and a fixed nitrogen rate of between 0.20% and 2%, expressed in relation to the dry weight of the said cationic starchy material.

16. A cationic starchy material consisting of a corn or potato starch according to claim 15, having simultaneously:

a water fluidity (WF) of between 70 and 90, and a fixed nitrogen rate of between 0.22% and 1%, expressed in relation to the dry weight of the said cationic starchy material.

17. A process of manufacture of a sized or coated paper, wherein a starchy material selected from the group consisting of a fluidified starchy material obtained by a process which is carried out in a reactor suitable for continuous operation and with a humidity of the reaction mix, said mix including starch, of less than 25%, consisting in subjecting a starchy material to the hydrolyzing action of a chemical agent, wherein: the dwell time of the starchy material in the fluidification reactor is more than 5 minutes and less than 30 minutes, and the temperature at the core of said reactor is more than 60° C. and less than 100° C. approximately; a converted starchy material obtained by a process which is carried out in a reactor suitable for continuous operation and with a humidity of the reaction mix, said mix including starch, of less than 25%, consisting in subjecting a starchy material to the hydrolyzing action of a chemical agent, wherein: the dwell time of the starchy material in the fluidification reactor is more than 5 minutes and less than 30 minutes, and the temperature at the core of said reactor is more than 60° C. and less than 100° C. approximately, and, afterwards, at least one chemical modification of the fluidified starchy material, said modification being selected from the group consisting of etherification, esterification, sulphonation, oxidation and plastification, cationisation, hydroxyalkylation and acetylation; a converted starchy material obtained by a process which is carried out in a reactor suitable for continuous operation and with a humidity of the reaction mix, said mix including starch, of less than 25%, consisting in subjecting a starchy material to the hydrolyzing action of a chemical agent, wherein: the dwell time of the starchy material in the fluidification reactor is more than 5 minutes and less than 30 minutes, and the temperature at the core of said reactor is more than 60° C. and less than 100° C. approximately, wherein the starchy material is subjected simultaneously to the fluidification process and to at least one stage of chemical modification selected from the group consisting of etherification, esterification, sulphonation, oxidation and plastification, cationisation, hydroxyalkylation and acetylation; a converted cationic starchy material obtained by a process which comprises a fluidification stage carried out with a humidity of the reaction mix, said mix including starch, of less than 25%, and a subsequent stage of cationisation of the starchy material thus fluidified carried out with a humidity of the reaction mix, said mix including starch, of less than 25%; a cationic starchy material having simultaneously a water fluidity (WF) of between 65 approximately and 100, and a fixed nitrogen rate of between 0.30% and 0.48%, expressed in relation to the dry weight of the said cationic starch material; a cationic starchy material having simultaneously a water fluidity (WF) of between 50 approximately and 100, and a fixed nitrogen rate of between 0.04% and 0.12%, expressed in relation to the dry weight of the said cationic starchy material; and a cationic starchy material consisting of a corn or potato starch having simultaneously a water fluidity (WF) of between 65 approximately and 100, and a fixed nitrogen rate of between 0.20% and 2%, expressed in relation to the dry weight of the said cationic starchy material, is used as a sizing agent or a coating agent.

18. A process of manufacture of a sized or finished textile, wherein a starchy material selected from the group consisting of a fluidified starch material obtained by a process which is carried out in a reactor suitable for continuous operation and with a humidity of the reaction mix, said mix including starch, of less than 25%, consisting in subjecting a starchy material to the hydrolyzing action of a chemical agent, wherein: the dwell time of the starchy material in the fluidification reactor is more than 5 minutes and less than 30 minutes, and the temperature at the core of said reactor is more than 60° C. and less than 100° C. approximately; a converted starchy material obtained by a process which is carried out in a reactor suitable for continuous operation and with a humidity of the reaction mix, said mix including starch, of less than 25%, consisting in subjecting a starchy material to the hydrolyzing action of a chemical agents, wherein: the dwell time of the starchy material in the fluidification reactor is more than 5 minutes and less than 30 minutes, and the temperature at the core of said reactor is more than 60° C. and less than 100° C. approximately, and, afterwards, at least one chemical modification of the fluidified starchy material, said modification being selected from the group consisting of etherification, esterification, sulphonation, oxidation and plastification, cationisation, hydroxyalkylation and acetylation; a converted starchy material obtained by a process which is carried out in a reactor suitable for continuous operation and with a humidity of the reaction mix, said mix including starch, of less than 25%, consisting in subjecting a starchy material to the hydrolyzing action of a chemical agent, wherein: the dwell time of the starchy material in the fluidification reactor is more than 5 minutes and less than 30 minutes, and the temperature at the core of said reactor is more than 60° C. and less than 100° C. approximately, wherein the starchy material is subjected simultaneously to the fluidification process and to at least one stage of chemical modification selected from the group consisting of etherification, esterification, sulphonation, oxidation and plastification, cationisation, hydroxyalkylation and acetylation; a converted cationic starchy material obtained by a process which comprises a fluidification stage carried out with a humidity of the reaction mix, said mix including starch, of less than 25%, and a subsequent stage of cationisation of the starchy material thus fluidified, carried out with a humidity of the reaction mix, said mix including starch, of less than 25%; a cationic starchy material having simultaneously a water fluidity (WF) of between 65 approximately and 100, and a fixed nitrogen rate of between 0.30% and 0.48%, expressed in relation to the dry weight of the said cationic starchy material; a cationic starchy material having simultaneously a water fluidity (WF) of between 50 approximately and 100, and a fixed nitrogen rate of between 0.04% and 0.12%, expressed in relation to the dry weight of the said cationic starch material; and a cationic starchy material consisting of a corn or potato starch having simultaneously a water fluidity (WF) of between 65 approximately and 100, and a fixed nitrogen rate of between 0.20% and 2%, expressed in relation to the dry weight of the said cationic starchy material, is used as a sizing agent or a finishing agent.

19. A process of manufacture of an adhesive for plaster sheets or corrugated board, wherein a starchy material selected from the group consisting of a fluidified starchy material obtained by a process which is carried out in a reactor suitable for continuous operation and with a humidity of the reaction mix, said mix including starch, of less than 25%, consisting in subjecting a starchy material to the hydrolyzing action of a chemical agent, wherein: the dwell time of the starchy material in the fluidification reactor is more than 5 minutes and less than 30 minutes, and the temperature at the core of said reactor is more than 60° C. and less than 100° C. approximately; a converted starchy material obtained by a process which is carried out in a reactor suitable for continuous operation and with a humidity of the reaction mix, said mix including starch, of less than 25%, consisting in subjecting a starchy material to the hydrolyzing action of a chemical agent, wherein: the dwell time of the starchy material in the fluidification reactor is more than 5 minutes and less than 30 minutes, and the temperature at the core of said reactor is more than 60° C. and less than 100° C. approximately, and, afterwards, at least one chemical modification of the fluidified starchy material, said modification being selected from the group consisting of etherification, esterification, sulphonation, oxidation and plastification, cationisation, hydroxyalkylation and acetylation; a converted starchy material obtained by a process which is carried out in a reactor suitable for continuous operation and with a humidity of the reaction mix, said mix including starch, of less than 25%, consisting in subjecting a starchy material to the hydrolyzing action of a chemical agent, wherein: the dwell time of the starchy material in the fluidification reactor is more than 5 minutes and less than 30 minutes, and the temperature at the core of said reactor is more than 60° C. and less than 100° C. approximately, wherein the starchy material is subjected simultaneously to the fluidification process and to at least one stage of chemical modification selected from the group consisting of etherification, esterification, sulphonation, oxidation and plastification, cationisation, hydroxyalkylation and acetylation; a converted cationic starchy material obtained by a process which comprises a fluidification stage carried out with a humidity of the reaction mix, said mix including starch, of less than 25%, and a subsequent stage of cationisation of the starchy material thus fluidified, carried out with a humidity of the reaction mix, said mix including starch, of less than 25%; a cationic starchy material having simultaneously a water fluidity (WF) of between 65 approximately and 100, and a fixed nitrogen rate of between 0.30% and 0.48%, expressed in relation to the dry weight of the said cationic starchy material; a cationic starchy material having simultaneously a water fluidity (WF) of between 50 approximately and 100, and a fixed nitrogen rate of between 0.04% and 0.12%, expressed in relation to the dry weight of the said cationic starchy material; and a cationic starchy material consisting of a corn or potato starch having simultaneously a water fluidity (WF) of between 65 approximately and 100, and a fixed nitrogen rate of between 0.20% and 2%, expressed in relation to the dry weight of the said cationic starchy material, is used as an adhesive agent.

* * * * *